United States Patent [19]
Madduri

[11] Patent Number: 5,764,982
[45] Date of Patent: Jun. 9, 1998

[54] PEER-TO-PEER COMMUNICATION INTERFACE

[75] Inventor: Hari Haranath Madduri, Austin, Tex.

[73] Assignee: International Business Machines Corporation, Armonk, N.Y.

[21] Appl. No.: 289,143

[22] Filed: Aug. 11, 1994

Related U.S. Application Data

[63] Continuation of Ser. No. 969,671, Oct. 30, 1992, abandoned.
[51] Int. Cl.$^6$ ...................................... G06F 13/14
[52] U.S. Cl. .................. 395/680; 364/242.5; 395/200.2; 395/200.02; 395/710
[58] Field of Search ..................................... 395/650, 700, 395/710, 680, 681, 682, 683, 684, 200.02, 200.2; 364/242.5

[56] References Cited

U.S. PATENT DOCUMENTS 5,187,790  2/1993  East et al. .............................. 395/725

OTHER PUBLICATIONS

Operating Systems, by H. M. Deitel p. 496, 1990.
DEC Professional vol.; v9 Issue; n2 Pagination p. 36(5) by Shapiro, Lawrence S.; Bourne, Philip E.; Feb. 1990.
H.M. Deitel, "Operating Systems", 1990, pp. 403, 601, 602.
"Creating a network service using the client–server model and LAN Manager 2.0" by Brendan W. Dixon, Microsoft Systems Journal, Jan. 1991 v6 n1 p. 45 (20).
"The PC–to–Macintosh connection" by Kelly R. Conatser, Lotus Sep. 1991 v7 n9 p. 47(4).
"How to make networks workable: system design" P.C. Letter Jul. 8, 1990 v6 n9 p. 1(6).
"The Network Computing Architecture and System: An Environment for Developing Distributed Applications" by Terence H. Dineen et al. IEEE 1988.
"A perspective on Advanced Peer–to–Peer Networking" by P.E. Green et al. IBM Systems Journal, mb vol. 26, No. 4, 1987.
"Mactivity activity", LAN Magazine Sep. 1991 v6 n9 p. 145(4).
"IBM opens gate to communictions", Datamation Aug. 15, 1991 v37 n16 p. 64(1).
"Common Object Request Broker: OMG's new standard for distributed object management" by John R. Rymer Patricia Seybold's network Monitor Sep. 1991 v6 n9 p. 3(25).
"SUPRA–RPC: Subprogram Parameters in Remote Procedure, Calls" by A. Stoyenko, Parallel and Distributed Processing, 1991 IEEE pp. 620–627.
"Common Object Request Broker: OMG's new standard for distubuted object management" by John Rymer, Patricia Seybold's Network Monitor Sep. 1991 v. 6 n. 9 p. 3 (25).

(List continued on next page.)

Primary Examiner—James P. Trammell
Assistant Examiner—Michael T. Richey
Attorney, Agent, or Firm—Jeffrey S. LaBaw

[57] ABSTRACT

A method and system for generating symmetrical communication interfaces using asymmetrical tools defines two interface definition files. The two interface definition files are compiled by an interface definition compiler to create first role and second role interface files, such as client and server roles for two symmetrical replicas. The first role interface file resulting from the compile of the first interface definition file is discarded, while the second role interface file resulting from the compile of the second interface definition file is also discarded. The first role interface file resulting from the compile of the second interface definition file and the second role interface file resulting from the compile of the first interface definition file are replicated in a plurality of systems coupled to the network. A preferred way of generating a second interface definition file from a first interface definition file is an automatic interface definition file editor which modifies a character string in each function name in the first interface definition file.

18 Claims, 3 Drawing Sheets

OTHER PUBLICATIONS

"Context driven call: Principles" by Rancov et al. GLOBECOM '92, IEEE Global Telecommunications Conference, pp. 296–300.

"A general model and mechanism by model–level heterogeneous RPC Interoperability" by Stoyenko, Parallel and Distributed Processing, IEEE, pp. 668–675 1990 Proceedings.

Millikin, M., "Netwise: changing strategies to deliver distributed computing", Patricia Seybold's Network Monitor, May 1991 v6 n5 p. 16(6).

Millikin, M., "Digital NAS: services for the distributed computing environment", Patricia Seybold's Network Monitor, Mar. 1991 v6 n3 p. 1(13).

Millikin, M. "Sun Open Network Computing", Patricia Seybold's Network Monitor Apr. 1991 v6 n4, p. 1(13).

PEER-TO-PEER COMMUNICATION INTERFACE

This is a continuation of application Ser. No. 07/969,671 filed Oct. 30, 1992, now abandoned.

DESCRIPTION

Background of the Invention

This invention relates generally to communication within a local area network. More particularly, it relates to generating a symmetrical set of replicas in a plurality of nodes using client-server oriented tools.

It is becoming increasingly prevalent to couple a plurality of data processing systems in a distributed environment via a local area network or wide-area network or other similar means. The networks are becoming increasingly complicated with several different LAN protocols coupled together with data processing systems from multiple vendors in the network. The prevailing model within a local area network is a client-server or master slave model. In this model, a process on the client or master data processor requests a service from a process on the server or slave data processor. A competing model is a peer-to-peer relationship in which each server, or at least a subset thereof, is essentially a duplicate of the others in the network. Because of the asymmetry in the client and server roles, it is awkward to use a tool developed in the client-server environment to build program components which have a peer-to-peer relationship. Program components built with such tools tend to have intermediate segments of code which are error prone and hard to maintain.

To explain the problem, consider the following: assume that a distributed name service will be built on a plurality of data processors in the network. On each machine, there is a single instance of a name server. Clients from any machine in the network can direct their queries to the local server. Each server only knows a subset of all the names in the entire distributed name service. When the server gets a query on a name on which it has no information it calls its peer name servers to resolve the name. In replicated servers, the interface for a name look-up should be the same, whether the call is from a client or remote peer, as all run identical sets of programs. The advantage of this uniformity is none of the servers have to deal with any special cases, i.e., they do not have to check whether the call is from a peer server or from an outside client.

If a set of replicas were to be developed by a traditional client-server tool, the call which the server makes to another server looks exactly like the one the server itself answers. This may make a remote procedure call look like a recursive call, rather than a call to its peer, having the effect of short circuiting all remote calls.

To prevent such a short circuit, documentation for the Distributed Computing Environment (DCE) suggests that two names be used for each server function. One name is used by any client of that server and the other name is used for the actual implementation of the function in the server. The module which implements the functions can be called the manager. A manager entry point vector is used to connect the name used by the client and the actual implementation name. While the method works, a programmer must remember to change the manager entry point vector whenever the manager functions are added or deleted. Further, this scheme works by matching the serial number of the function in the server's interface with that of the manager function in the manager's entry point vector. There is no checking done at compile time, e.g., checking that the number of parameters match each other to catch some errors. This can lead to unexpected run-time errors.

A second way the prior art seeks to solve the problem is to eliminate a client switch file on the client side and require that the serve call their peers using a client entry point vector rather than the usual function name. This exposes the way the remote procedure call (RPC) works to the developers of the distributed server programs and requires an understanding of the RPC on the part of the developer. This is not desirable.

The invention suggests an improved way to achieve peer-to-peer communication with client-server tools which leads to fewer errors and easily maintainable code.

SUMMARY OF THE INVENTION

It is therefore an object of the invention to generate a symmetrical communication interface for a network using asymmetrical tools.

It is another object of the invention to reduce the opportunity to introduce operator originated errors in the symmetrical communication interface.

It is another object of the invention to automate the process of generating symmetrical communication interfaces.

These and other objects of the invention are accomplished by defining two interface definition files for a particular distributed application to interface between its replicas across the network. A first interface definition file is used for the replica in a second role to all a second replica in a first role and a second interface definition file is used for the replicas playing the first role to define their services. The first and second roles, for example, are server and client roles. Both interfaces use the same interface number, typically, the identification number is found in the very first line of the file. In one preferred embodiment, each interface definition file looks identical to a corresponding server code line except for a minor prefix or suffix for all function names in one of the files.

In the process of the present invention, the following steps are performed. Two interface definition files are defined, both having the same imbedded ID. Both interface files are run through an interface definition compiler to generate interface files for the distributed application. In the Distributed Computing Environment, from which this invention is adapted, the interface files are called the client and server stub files. The server stubs from the first interface definition files are discarded while the client stubs from the second interface definition files are discarded or vice versa. The resulting set of client and server stubs are replicated for a set of peer systems running the application in the network. When linking a peer application to implement the services advertised in the interface definition file, the resulting client and server stubs are used. When linking in an ordinary client program, the client stub is used.

BRIEF DESCRIPTION OF THE DRAWINGS

These and other objects and features of the invention will be better understood with reference to the attached drawings and following description.

DETAILED DESCRIPTION OF THE DRAWINGS

The invention may be run on a variety of computers or collection of computers under a number of different operating systems. The computer could be for example, the personal computer, a mini computer or mainframe computer. Preferably, however, a plurality of computers which are part of a network such as a Local Area Network or Wide Area Network or larger teleprocessing system are used. Although the specific choice of computer is limited only by disk and disk storage requirements, computers in the IBM PS/2 lot series of computers could be architected according to the present invention. For additional information on IBM's PS/2 series of computers, the reader is referred to *Technical Reference Manual Personal Systems/2 Model 50, 60 Systems* IBM Corporation, Part No. 68X2224 Order Number S68X-2224 and *Technical Reference Manual Personal Systems/2 (Model 80) IBM Corporation* Part No. 68X2256 Order Number S68X-2254. One operating system which an IBM PS/2 personal computer may run is IBM's OS/2 2.0 for more information on the IBM OS/2 2.0 operating System the reader is referred to *OS/2 Technical Library, Programming Guide Vo. 1, 2, 3 Version 2.00*, Order Nos. 10G6261, 10G6495, 10G6494.

In the alternative, the computer systems might be in the IBM RISC System/6000 (TM) line of computers which run on the AIX (TM) operating system. The various models of the RISC System/6000 is described in many publications of the IBM Corporation, for example, *RISC System/6000, 7073 and 7016 POWERstation and POWERserver Hardware Technical Reference*. Order No. SA23-2644-00. The AIX operating system is described in *General Concepts and Procedure—AIX Version 3 for RISC System/6000* Order No. SC23-2202-00 as well as other publications of the IBM Corporation.

Figure 1:
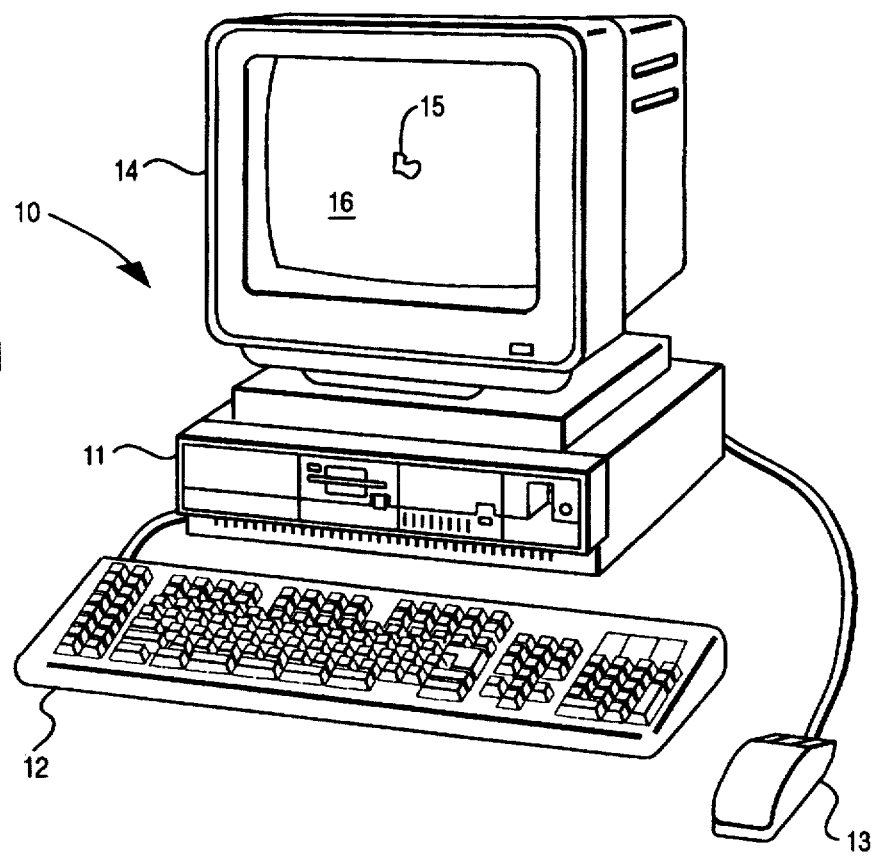
FIG. 1 depicts a typical computer which would be coupled to a network environment in accordance with the resent invention.

In FIG. 1, a computer 10, comprising a system unit 11, a keyboard 12, a, mouse 13 and a display 14 are depicted. The screen 16 of display device 14 is used to present the visual changes to the data object. The graphical user interface supported by the operating system allows the user to use a "point and shoot" method of input by moving the pointer 15 to an icon representing a data object at a particular location on the screen 16 and press one of the mouse buttons to perform a user command selection. The data object selected will appear on a window which may present any number of selected views of the object.

Figure 2:
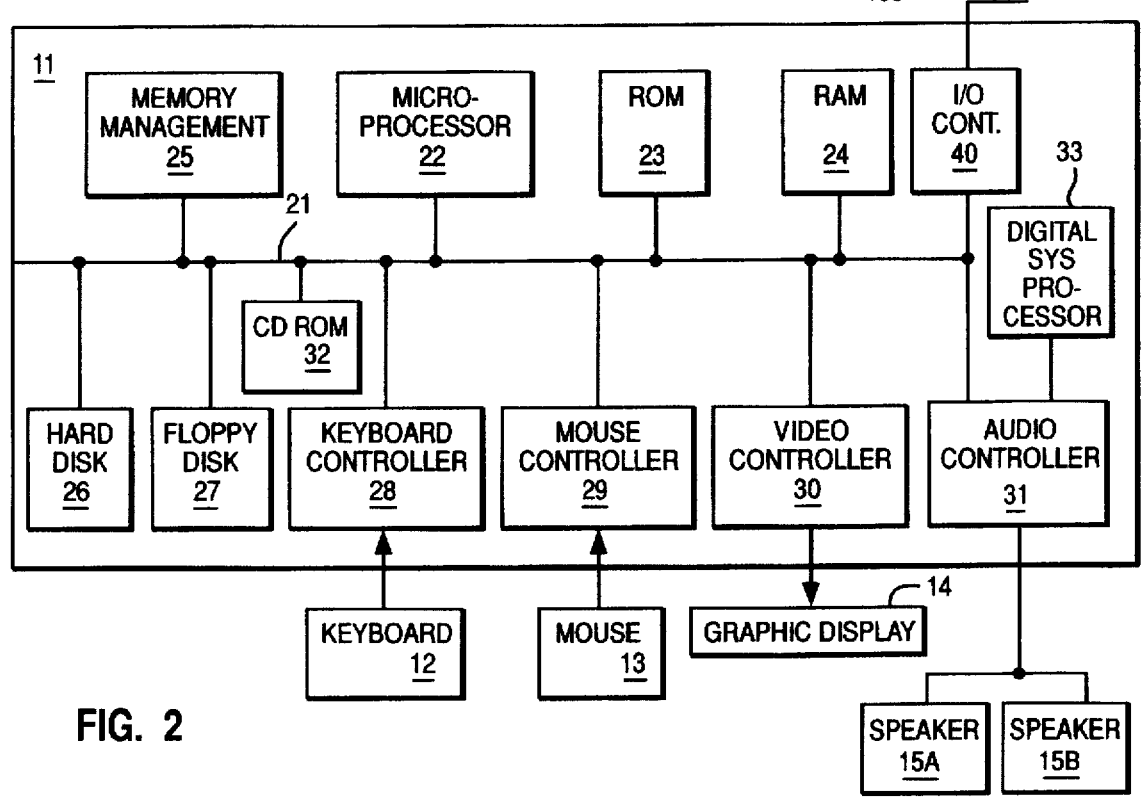
FIG. 2 is a block diagram of the components of the computer shown in FIG. 1.

FIG. 2 shows a block diagram of the components of the multimedia personal computer shown in FIG. 1. The system unit 11 includes a system bus or buses 21 to which various componenets are coupled and by which communication between the various componenets is accomplished. A microprocessor 22 is connected to the system bus 21 and is supported by read only memory (ROM) 23 and random access memory (RAM) 24 also connected to system bus 21. A microprocessor in the IBM multimedia PS/2 series of computers is one of the Intel family of microprocessors including the 386 or 486 microprocessors, however, other microprocessors included, but not limited to Motorola's family of microprocessors such as the 68000, 68020 or the 68030 microprocessors and various Reduced Instruction Set Computer (RISC) microprocessors manufactured by IBM, Hewlett Packard, Sun, Intel, Motorola and others may be used in the specific computer.

The ROM 23 contains among other code the Basic Input-Output System (BIOS) which controls basic hardware operations such as the interaction of the disk drives and the keyboard. The RAM 24 is the main memory into which the operating system and multimedia application programs are loaded. The memory management chip 25 is connected to the system bus 21 and controls direct memory access operations including, passing data between the RAM 24 and hard disk drive 26 and floppy disk drive 27. A CD ROM 32 also coupled to the system bus 21 is used to store the large amount of data present in a multimedia program or presentation.

Also connected to this system bus 21 are various I/O controllers: The keyboard controller 28, the mouse controller 29, the video controller 30, and the audio controller 31. As might be expected, the keyboard controller 28 provides the hardware interface for the keyboard 12, the mouse controller 29 provides the hardware interface for mouse 13, the video controller 30 is the hardware interface for the display 14, and the audio controller 31 is the hardware interface for the speakers 15a and 15b. Also coupled to the system bus 21 is digital signal processor 33 which corrects the sound produced by the speaker system and is preferably incorporated into the audio controller 31. The speakers 15a and 15b may be used to present audio objects to the user. Lastly, also coupled to the system bus is an I/O controller 40 such as a Token Ring adapter and which couples the system to the local area network 106.

The Distributed Computing Environment (DCE) is an effort by a group of companies including IBM, DEC and HP to solve a set of problems for a distributed environment. Among the problems is the implementation of a DCE Remote Procedure Call (RPC). An RPC is one model of communication between client and server sides of an application. It is adapted by the present invention to communicate between a plurality of peer applications in a distributed environment. In a remote procedure call, as in a traditional local procedure call, control is passed from one code module to another, and then returns to the original code module. However, a local procedure call typically will use code modules which are in the same address space on the same machine; an RPC calls a remote procedure which runs on a different address space, usually on different system coupled to the network. In a remote procedure call, arguments and return values must be packed into messages for transport over the network. An RPC mechanism is used to make this procedure transparent to the application programmer so that it looks similar to a local procedure call.

An RPC facility shields the programmer from the details of the network transport between peer applications. Using a remote procedure call, network details such as different architectures, operating systems communication protocols do not necessitate a rewrite of an application for each possible situation. In DCE, the RPC looks almost like a local call. There are several components which are used to mask the network including the interface definition file and its compilier, a universal unique identifer generator and the RPC runtime. Two RPC protocols are generally supported the connection oriented Transmission Control Protocol/Internet Protocol (TCP/IP) and the connectionless User Datagram Protocol/Internet Protocol (UDP/IP).

The interface definition file is described in a DCE Interface Definition Language (IDL). The interface definition file is compiled using the IDL compiler first into a computer language like C and then into object code into two interface files one for the server side of the application and one for the client side of the application. These interface files are called the server stub and the client stub. Older implementation of the DCE concept also included a second client interface file called the client switch stub.

The interface definition file is used to define each RPC interface. An interface is a group of functions that a particular server application can perform. For example, a financial application might perform operations to debit, credit or read the balance of an account. Each of these functions must be defined in the interface definition file for the financial application. In DCE, only the calling interface is defined, not the implementation of the procedure. After compilation, the client stub is linked with the calling portion of the application which make calls across the network for services from another portion of the application, traditionally, the client. The server stub is linked with the part of the application which performs the functions defined in the interface definition file, traditionally, the server.

The RPC runtime library includes a set of routines which implement communication between the peers of the distributed application on the network. Among the tasks performed include finding the server in the distributed system, communication between client and server, managing states between requests and processing errors in communication. The universal unique identifier generator issues a unique identifier for each RPC interface. The DCE RPC modules may also include a security service for secure communications, a name service API to help locate servers in the network, an RPC daemon to manage transport endpoints in the network and a control program to administer the RPC daemon.

The Network Computing System (NES) 1.0 is part of the AIX and the system Distributed Computing Environment Extension 1.0 to AIX are examples of RPC products which include an IDL compiler.

After the interface files are produced, the calling portion of the distributed application must find the portion of the application which will perform the requested function. This process is called binding. The calling application can go to a directory service for the location of the application implementing a particular interface to look up information including the types of services performed, the types of objects managed and the interfaces supported. The server application, or other application implementing the interface is said to "advertise" its services in the directory service. The RPC daemon is used to update the exact network endpoint of the server application in the directory service as it can change each time the server is started.

Figure 3A:
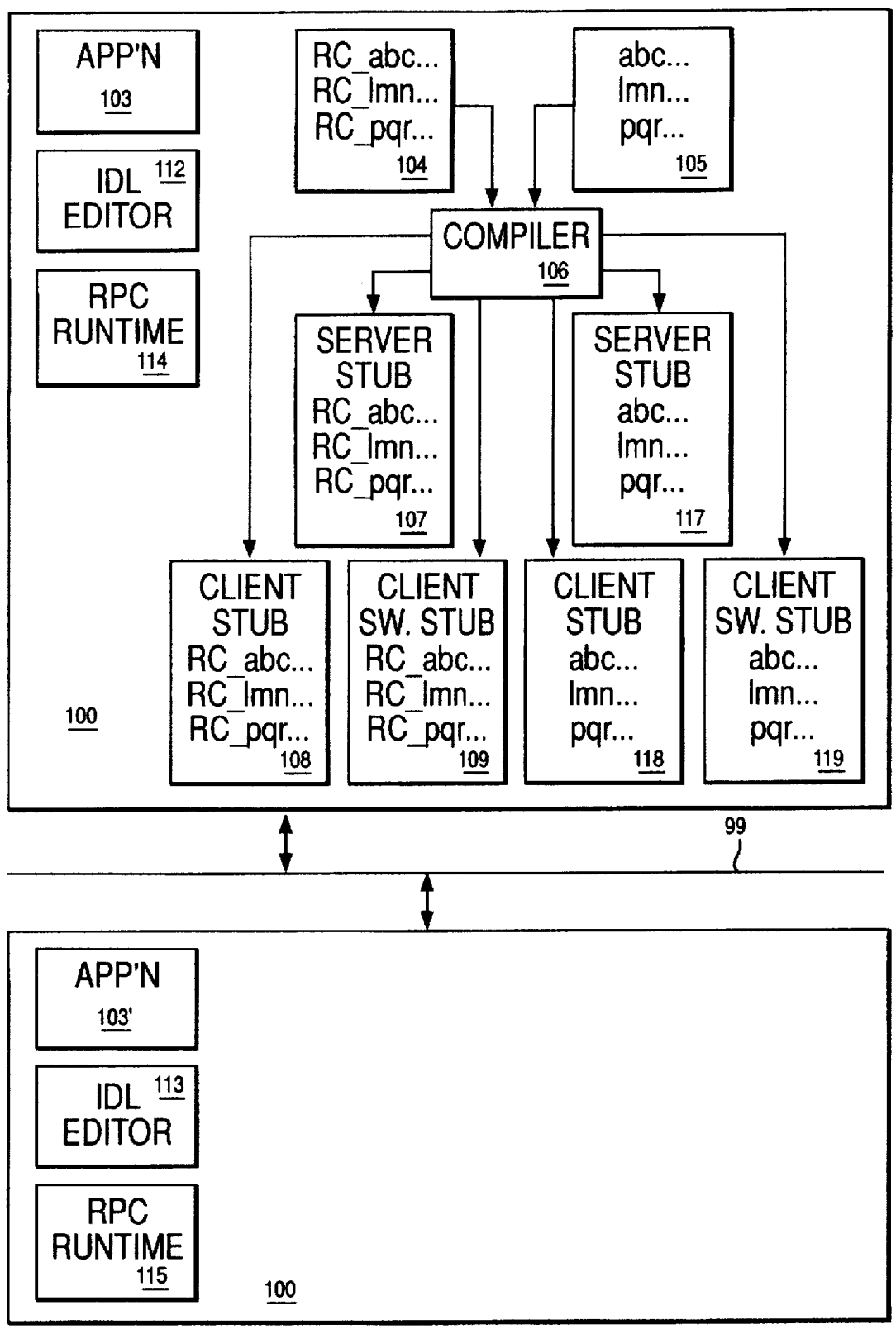
FIGS. 3A and 3B depict the code modules in two workstations coupled to a network while the symmetrical communication interface is generated and replicated.

FIG. 3A illustrates the code modules in two data processing systems 100, 110 coupled to the network 99 just after the server and client interface files or stubs are generated. A distributed application and the stubs from the invention would generally be copied to a greater number of systems, but only two systems are illustrated for the sake of clarity. In the random access memory of each system 100, 110 there are copies of a network application 103, 103', which will require services from the other systems in the network 99. For this application 103, two interface definition files, 104, 105 are created in the first system 100 both having the same interface definition ID. From each interface definition file 104, 105, an interface definition compiler 106 produces two or three stub files. One stub file is called a server stub 107, 117 which is to be attached to the server or server portion of the distributed application. The other two are called a client stub 108, 108' and the client switch stub 109', 119" which is optional and are associated with the client copy of the application at the local system. From the first interface definition file 104, the client stubs, the client stub 108 and the client switch stub 109 are discarded and the server stub 107 is kept. From the second interface definition file 105, the server stub 117' is discarded and the client stub portions, client stub 118 and client switch stub 119 are kept.

Also, depicted is the interface definition editor 112, 113 which is used to generate the second interface definition file 105 from the first interface definition file 104. While a special purpose editor can be used, an ordinary stream editor such as SED in the AIX environment can be used. The RPC runtime modules 114, 115 in the respective systems 100, 110 which provide communication services between the application replicas.

Figure 3B:
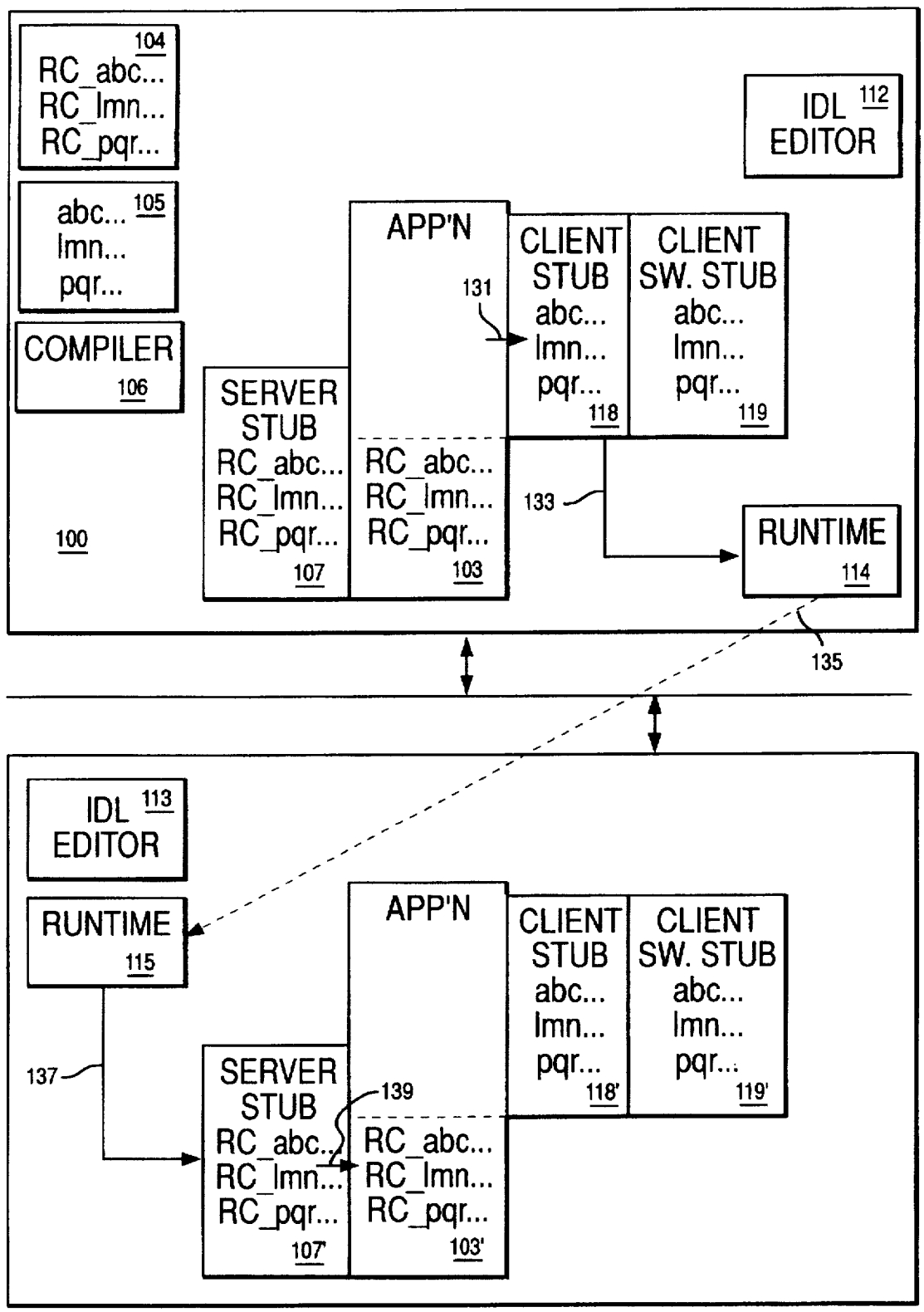

FIG. 3B illustrates the code modules in the two workstations 100, 110 after the extra server and client stub files have been deleted from the first system 100 and the remaining server and client stub files have been replicated to the second system 110. Note that the server stub 107 from the first interface definition file 104 and the client stubs 118", 119" from the second interface definition file 105 are replicated throughout the network and are linked with the client and server portions of the replicas of the application program 103.

The short circuit problem is solved because when a distributed application communicates to a replica on a remote machine, it uses the client stubs generated by the second interface definition file. When the application wants to act as a server, it uses the server stub generated by the first interface definition file. While the two interfaces have different names or procedures they both share the same ID number for the interface definition. In the DCE system, the interface ID number is used to identify the interface. The network call for a particular procedure from a server includes the interface ID number and function serial number within the interface, but not the actual function name which is used by the application. This characteristic of the Distributed Computing Environment allows the present invention to work. In essence, there is an interface called by two sets of names. When the interface acts as a server one set of names in the server stub is used. When the interface acts as a client, the other set of names in the client stub is used. When the service is called using the client set of names, the service will eventually get to the server set of names by which it is actually giving service.

Also in FIG. 3B, a remote procedure call according to the invention is depicted. On the first system 100 and the second system 110, the application peers 103, 103' are started up and advertise with the directory service about their location in the network. In this example, assume that the application peers 103, 103' are part of a distributed financial application. Thus, when an application needs financial services or the financial application peer 103 needs to contact its peer 103', it will know where to send an RPC. Eventually, the peer 103 on the first system 100 can not answer a request on its own and so decides to call its peer 103' on the second system 110 for assistance. The peer 103 calls the directory service for its peer's network address and sends a remote procedure call 131 to the client stub 118'. The client stub 118' transforms the arguments of the call to a network message 133 and calls the runtime library which sends the message 135 to the runtime 115 on the second system 110.

The RPC is received by the runtime library 115 on the second system 110 which sends the network message 137 to the server stub 107'. The server stub 107' unpacks the arguments and passes them to the appropriate portion of the peer 103' to implement the requested function.

The RPC 131 generated by the application 103 to the client stub 118 uses the function name shared by the client side of the application and the client stub 118. For example, assume the RPC 131 was for the third function beginning with the letters "pqr . . . ". The client stub translates this into a network call which includes the interface ID and the serial number of the function as well as network protocol info. Assuming the interface ID for the application 103, is "A103B", the network message 133 could take the form:

A103B¦3¦ . . . ¦ . . .

where "A103B" is the identification number and "3" is the serial number of "pqr . . . " in the interface since it is the third function. When the message 137 reaches the server stub, it is unpacked to a procedure call which the server portion will understand. Although the server stub has the same interface ID when it searches for the function which corresponds to serial number "3", "RC_pqr . . . " is retrieved and passed to the server portion.

The process by which the server portion responds is the exact reverse. The server sends the result of the RPD to the server stub which packs them into network message. The server stub sends the network messages to the local runtime library which sends it to the runtime library on the client system. The runtime library sends it to the client stub which unpacks the message for the calling peer.

As the same programmer or team of programmers who designs the distributed application designs the interface definition file, he will know the conventions used in both the eventual server and client stubs so that the application can be written to make the appropriate RPC when it is acting in the server or client role. The process by which a second interface definition file is generated can be easily automated by using an editor such as a stream editor. For instance, in the examples below, the second interface definition file (sampleTwo.idl) was created by issuing the command:

sed 's/RC_// sample.idl>sampleTwo.idl in AIX, where sample.idl is the first interface definition file. Sed is a stream editor which is a standard program on all UNIX programs. Alternatively, a customized tool could be designed to generate the second interface definition file.

The utility "make" available in AIX and other versions of UNIX allows one to automate a series of steps in building an end product, e.g., a program, a document, or an object code library. "Make" reads a file, typically named "Makefile", which contains a series of rules and dependency statements. The dependency statements have a target name and a list of prerequisites. The prerequisites are files or other objects which must be either available or built before the target can be built. A rule specifies what programs should be run to produce the target from its prerequisite files. For example, to build a target program called "myprog" from a C source file "myprog.c" file one would specify the dependency as follows:

myprog: myprog.c

To show the rule that produces the desired target, one would specify:

cc-o myprog myprog.c

Thus, the C compiler called "cc" is run on myprog.c and the final result is placed in a file called "myprog".

If myprog.c itself is the result of running some other program, then "make" looks up the appropriate rules and runs those programs to produce myprog.c. In general, "make" starts with the things that do not have any prerequisites and builds others step by step until the desired target is built. It also uses the date and time stamps on files to know exactly which programs have to be rerun to build an up-to-date target. In the above example, whenever myprog.c is changed, a consistent "myprog" is rebuilt by simply typing the program "make" once.

The "make" utility is thus an easy way to automate the process of updating the distributed applications, the interface definition files and the interface files, the server and client stubs. One would begin with a change to the first interface definition file, e.g., add a new function which the server role will provide. A makefile could be used to rebuild the second interface definition file, compile the first and second definition files by calling the idl compiler, thus creating the first and second sets of server and client stubs, discarding the excess stubs and linking the remaining stubs to the distributed application peers so that they know about the new function.

A sample interface definition file follows below. Note that each of the functions include an "RC_" in the function name.

```
/*
*       @(#)master.idl 1.6 12/21/90 10:11:18 (c) IBM Corp.
1990
*/
%c
[
uuid(4cbf3db01d34.02.81.23.1c.d8.00.00.00),
port(ip: [6666]), version(1)
]
interface PODmaster  {
#include|<data.const.h>
#include|<data.types.h>
||void RC_registerShadow( handle__t [in] h, ObjRef [in]
newpod, Mode [in] m);
   ||void RC_unregisterShadow( handle__t [in] h, ObjRef [in]
oldPod);
   ||int||RC_requestToken(handle__t [in] h,
   | ||ObjRef [in] shadow, int [in, out] *shadoVersion,
   | ||string0(MTHD_NAME_MAX] [in] *methodname,
   | ||LogRecord [out] *logBuf );
   ||void RC_releaseToken(handle__t [in] h,ObjRef [in] shadow,
string0
   [MTHD_NAME_MAX] [in] *methodname);
   | || /* how do you indicates params to method ??*/
   ||MasterBidRetCode    RC_WantToBeMaster(handle__t     [in]
h,ObjRef [in] shadow);
   ||void RC_applyUpdates(handle__t [in]    h, VerNumber [in]
ver, LogRecord [in]
   &1Rec);
   ||void RC_sendRefresh (handle__t [in] h,ObjRef [in] shadow,
VerNumber [in]
   version, LogRecord [in, out] *1Rec);
```

A second sample interface definition file follows below. Note that the function names have been shorteded by dropping the "RC_" characters.

```
/*
*       @(#)master.idl 1.6 12/21/90 10:11:18 (c) IBM Corp.
1990
*/
%c
[
uuid(4cbf3db01d34.02.81.23.1c.d8.00.00.00),
port(ip: [6666]), version(1)
]
interface PODmaster  {
#include|<data.const.h>
#include   <data.types.h>
||void registerShadow( handle__t [in] h, ObjRef  [in]
newPod, Mode [in] m);
   ||void unregisterShadow( handle__t [in] h, ObjRef  [in]
oldPod);
   ||int||requestToken(handle__t [in] h,
   | ||ObjRef [in] shadow, int [in, out] *shadoVersion,
   | || string0 [MTHD_NAME_MAX] [in] *methodname,
```

```
   || || LogRecord [out] *logBuf );
   ||void releaseToken(handle_t [in] h,ObjRef [in] shadow,
string0
       [MTHD_NAME_MAX] [in] *methodname);
   ||| /* how do you indicates params to method ??*/
   ||MasterBidRetCode WantToBeMaster(handle_t [in] h,ObjRef
[in] shadow);
   ||void applyUpdates(handle_t [in] h, VerNumber [in]
ver,LogRecord [in] &1Rec);
   ||void sendRefresh (handle_t [in] h,ObjRef [in] shadow,
VerNumber [in]
       version, LogRecord [in, out] *1Rec);
   ||void savePOD (handle_t [in] h, ObjRef [in] shadow);
       }
```

This file is generated from Sample.idl file using the following command on AIX:

Sed's/RC-11' sample.idl>sample2.idl

Sed—is a stream editor that is a standard program on all UNIX Systems.

An abbreviated sample server stub file in the C language which results from compiling the first sample interface definition file in an IDL compiler is listed below. The first two functions from the interface definition file are included.

```
#define NIDL_GENERATED
#define NIDL_SSTUB
#include "master.h"
static RC_registerShadow_ssr
#ifdef _STDC_
(
    handle_t h,
    rpc_$ppkt_t *ins,
    ndr_$ulong_int ilen,
    rpc_$ppkt_t *outs,
    ndr_$ulong_int omax,
    rpc_$real_drep_t drep,
    rpc_$ppkt_t **routs,
    ndr_$ulong_int *olen,
    ndr_$boolean *free_outs,
    status_$t *st
)
#else
(
    h,
    ins,ilen,
    outs,omax,
    drep,
    routs,olen,
    free_outs,st)
handle_t h;
rpc_$ppkt_t *ins;
ndr_$ulong_int ilen;
rpc_$ppkt_t *outs;
ndr_$ulong_int omax;
rpc_$real_drep_t drep;
rpc_$ppkt_t **routs;
ndr_$ulong_int *olen;
ndr_$boolean *free_outs;
status_$t *st;
#endif
{
/* marshalling variables */
ndr_$ushort_int data_offset;
ndr_$ulong_int bound;
rpc_$mp_t mp, dbp;
ndr_$ushort_int count;
/* local variables */
Mode m_;
ndr_$char newPod_;
/* unmarshalling init */
data_offset=h->data_offset;
rpc_$init_mp(mp, dbp, ins, data_offset);
if (rpc_$equal_drep (drep, rpc_$local_drep))   {
/* unmarshalling */
    rpc_$unmarshall_char(mp, newPod_);
    rpc_$advance_mp(mp, 1);
    rpc_$align_ptr_relative (mp, dbp, 4);
    rpc_$unmarshall_ulong_int(mp, m_);
} else {
    rpc_$convert_char(drep, rpc_$local_drep, mp, newPod_);
    rpc_$advance_mp(mp, 1);
    rpc_$align_ptr_relative (mp, dbp, 4);
    rpc_$convert_ulong_int(drep, rpc_$local_drep, mp, m_);
}
/* server call */
RC_registershadow(h, &newPod, m_);
/* buffer non-allocation */
*free_outs=false;
*routs=outs;
*olen=0;
2. st->all=status_$ok;
}
static RC_unregisterShadow_ssr
#ifdef _STDC_
(
    handle_t h,
    rpc_$ppkt_t *ins,
    ndr_$ulong_int ilen,
    rpc_$ppkt_t *outs,
    ndr_$ulong_int omax,
    rpc_$real_drep_t drep,
    rpc_$ppkt_t **routs.
    ndr_$ulong_int *olen,
    ndr_$boolean *free_outs
    status_$t *st
)
#else
(
    h,
    ins,ilen,
    outs,omax,
    drep,
    routs,olen,
    free_outs, st)
handle_t h;
rpc_$ppkt_t *ins;
ndr_$ulong_int ilen;
rpc_$ppkt_t *outs;
ndr_$ulong_int omax;
rpc_$real_drep_t drep;
rpc_$ppkt_t **routs;
ndr_$ulong_int *olen;
ndr_$boolean *free_outs;
status_$t *st;
#endif
{
/* marshalling variables */
ndr_$ushort_int data_offset;
ndr_$ulong_int bound;
rpc_$mp_t mp, dbp;
ndr_$ushort_int count;
/* local variables */
ndr_$char oldPod_;
/* unmarshalling init */
data_offset=h->data_offset;
rpc_$init_mp(mp, dbp, ins, data_offset);
if (rpc_$equal_drep (drep, rpc_$local_drep))   {
/* unmarshalling */
    rpc_$unmarshall_char(mp, oldPod_);
} else {
    rpc_$convert_char(drep, rpc_$local_drep, mp, oldPod_);
}
/* server call */
RC_unregisterShadow(h, &oldPod_);
/* buffer non-allocation */
*free_outs=false;
*routs=outs;
*olen=0;
st->all=status_$ok;
:
:
:
globaldef PODmaster$epv_t PODmaster$manager_epv = {
RC_registerShadow,
```

```
RC_unregisterShadow,
RC_requestToken,
RC_releaseToken,
RC_WantToBeMaster,
RC_applyUpdates,
RC_sendRefresh,
RC_savePOD
};
static rpc_$server_stub_t PODmaster$server_epva[ ]={
(rpc_$server_stub_t)RC_registerShadow_ssr,
(rpc_$server_stub_t)RC_unregisterShadow_ssr,
(rpc_$server_stub_t)RC_requestToken_ssr,
(rpc_$server_stub_t)RC_releaseToken_ssr,
(rpc_$server_stub_t)RC_WantToBeMaster_ssr,
(rpc_$server_stub_t)RC_applyUpdates_ssr,
(rpc_$server_stub_t)RC_sendRefresh_ssr
(rpc_$server_stub_t)RC_savePOD_ssr
};
    globaldef rpc_$epv_t
PODmaster$server_epv=(rpc_$epv_t)PODmaster$server_epva;
```

An abbreviated client stub file in the C language which results from compiling the second sample interface definition file in an IDL compiler is listed below. The first two functions are included.

```
1. #define NIDL_GENERATED
#define NIDL_CSTUB
#include "master.h"
#include "pfm.h"
static void registerShadow_csr
#ifdef __STDC__
   (
   handle_t h_,
   ObjRef newPod_,
   Mode m_)
#else
   (h_, newPod_, m_)
#endif
#ifndef __STDC__
/* parameter declarations */
handle_t h_;
ObjRef newPod_;
Mode m_;
#endif
{
/* rpc_$sar arguments */
rpc_$ppkt_t *ip;
ndr_$ulong_int ilen;
rpc_$ppkt_t *op;
rpc_$ppkt_t *routs;
ndr_$ulong_int olen;
rpc_$real_drep_t drep;
ndr_$boolean free_outs;
status_$t st;
/* other client side local variables */
rpc_$ppkt_t ins;
rpc_$ppkt_t outs;
ndr_$ushort_int data_offset;
ndr_$ulong_int bound;
rpc_$mp_t mp, dbp;
ndr_$ushort_int count;
ndr_$boolean free_ins;
/* marshalling init */
data_offset=h_->data_offset;
bound=0;
/* bound calculations */
bound += 8;
/* buffer allocation */
if(free_ins=(bound+data_offset>sizeof(rpc_$ppkt_t)))
    ip=rpc_$alloc_pkt(bound);
else
    ip= &ins;
rpc_$init_mp(mp, dbp, ip, data_offset);
/* marshalling */
rpc_$marshall_char(mp, (*newPod_));
rpc_$advance_mp(mp, 1);
rpc_$align_ptr_relative (mp, dbp, 4);
rpc_$marshall_ulong_int(mp, m_);
rpc_$advance_mp(mp, 4);
/* runtime call */
ilen=mp-dbp;
op= &outs;
rpc_$sar(h_,
    (long)0,
    &PODmaster$if_spec,
    0L,
    ip,
    ilen,
    op,
    (long)sizeof(rpc_$ppkt_t),
    &routs,
    &olen,
    (rpc_$drep_t * )&drep,
    &free_outs,
    &st);
if(free_ins)
    rpc_$free_pkt(ip);
}
2. static void unregisterShadow_csr
#ifdef __STDC__
   (
   handle_t h_,
   ObjRef oldPod_)
#else
   (h_, oldPod_)
#endif
#ifndef __STDC__
/* parameter declarations */
handle_t h_;
ObjRef oldPod_;
#endif
{
/* rpc_$sar arguments */
rpc_$ppkt_t *ip;
ndr_$ulong_int ilen;
rpc_$ppkt_t *op;
rpc_$ppkt_t *routs;
ndr_$ulong_int olen;
rpc_$real_drep_t drep;
ndr_$boolean free_outs;
status_$t st;
/* other client side local variables */
rpc_$ppkt_t ins;
rpc_$ppkt_t outs;
ndr_$ushort_int data_offset;
ndr_$ulong_int bound;
rpc_$mp_t mp, dbp;
ndr_$ushort_int count;
ndr_$boolean free_ins;
/* marshalling init */
data_offset=h_->data_offset;
bound=0;
/* bound calculations */
bound += 1;
/* buffer allocation */
if(free_ins=(bound+data_offset>sizeof(rpc_$ppkt_t)))
    ip=rpc_$alloc_pkt(bound);
else
    ip= &ins;
rpc_$init_mp(mp, dbp, ip, data_offset);
/* marshalling */
rpc_$marshall_char(mp, (*oldPod_));
rpc_$advance_mp(mp, 1);
/* runtime call */
ilen=mp-dbp;
op= &outs;
rpc_$sar(h_,
    (long)0,
    &PODmaster$if_spec,
    1L,
    ip,
    ilen,
    op,
    (long)sizeof(rpc_$ppkt_t),
    &routs,
    &olen
```

```
      (rpc_$drep_t *)&drep,
      &free_outs,
      &st);
  if(free_ins)
      rpc_$free_pkt(ip);
}
globaldef PODmaster$epv_t PODmaster$client_epv = {
  registerShadow_csr,
  unregisterShadow_csr,
  requestToken_csr,
  releaseToken_csr,
  WantToBeMaster_csr,
  applyUpdates_csr,
  sendRefresh_csr,
  savePOD_csr
};
```

A client switch file in the C language which results from compiling the second sample interface definition file in a IDL compiler is listed below.

```
#define NIDL_GENERATED
#define NIDL_CSWTCH
#include "master.h"
void registerShadow (h, newPod, m)
handle_t h;
ObjRef newPod;
Mode m;
{
(*PODmaster$client_epv.registerShadow) (h, newPod, m);
}
void unregisterShadow (h, oldPod)
handle_t h;
ObjRef oldPod;
{
(*PODmaster$client_epv.unregisterShadow) (h, oldPod);
}
```

Although the invention has been described in terms of the client and server roles in the DCE nomenclature, it can be applied in any situation in which a plurality of symmetrical replicas are built from an asymmetrical computing paradigm. For example, master-slave or producer-consumer paradigms are used to model program behavior within a data processing system. In a master-slave relationship, the master controls system resources to which the slave requires access. In a producer-consumer relationship, the producer is the source of a commodity, e.g. messages, which the consumer requires. When a symmetrical distributed application is built from one of these paradigms. each peer could take either role and may switch from one role to the other. Thus, for a producer-consumer paradigm, there may be one version of the interface when a peer is operating in the producer role and another version of the interface when the peer is working in the consumer role.

The interface definition files, interface files and remote procedure calls above are used for procuring a particular process from a remote peer. However, rather than comprising a list of processes, the interfaces could as easily comprise a list of objects which the local peer wishes to call. Object oriented programming is becoming increasingly popular. It is a logical extension of the present invention to use an object oriented interface.

While this invention has been described with respect to particular embodiments above, it would be understood by those skilled in the art that modifications may be made without departing from the spirit and scope of the present invention. While the embodiments above use a distributed application comprising a set of replicas, normal client applications which require the services offered by the distributed application could also be intergrated into the network. The client applications would be linked only with the client stub as they only fill the client role, rather than both the client and server stubs linked to the distributed replicas. These embodiments are for purposes of example and illustration only and are not to be taken to limit the scope of the invention narrower than the scope of the appended claims:

I claim:

1. A method for communication for a peer-to-peer application distributed in a computer network, comprising the steps of:

linking copies of a first and a second interface file to a plurality of replicas of the peer-to-peer application, the first and second interface files including an interface identification number and a different respective first and second set of service names for a set of common services;

calling for a first service from a first replica playing a first role by a second replica playing a second role with the second interface file linked to the second replica, the first service call including the interface identification number and a serial number of the first service; and transforming the first service call with the first interface file linked to the first replica using the serial number to identify the first service to a procedure call understood by the first replica.

2. The method as recited in claim 1 in which prior to the linking step, the method further comprises the steps of:

storing a first and a second interface definition file each having an identical identification number in a computer memory; and compiling the first and second interface definition files with a compiler which produces asymmetric interface files, the compiler also in the computer memory, to produce the first interface file compiled from the first interface definition file and the second interface file compiled from the second interface definition file.

3. The method as recited in claim 2 which further comprises the step of:

creating the second interface definition file by copying the first interface definition file and modifying a character string of a plurality of service names in the copy of the first interface definition file.

4. The method as recited in claim 3 wherein the creating step is performed by a file editor.

5. The method as recited in claim 1 wherein the first interface file is a server interface file and the second interface file is a client interface file.

6. The method as recited in claim 1 wherein the service names in the first interface file differ from the service names in the second interface file by an identical set of characters.

7. A system for communication for a peer-to-peer application distributed in a computer network comprising:

means for linking copies of a first and a second interface file to a plurality of replicas of the peer-to-peer application, the first and second interface files including an interface identification number and a different respective first and second service names for a set of common services;

means for calling for a first service from a first replica playing a first role by a second replica playing a second role with the second interface file linked to the second replica, the first service call including the interface identification number and a serial number of the first service; and means for transforming the first service call with the first interface file linked to the first replica using the serial number to identify the first service to a procedure call understood by the first replica.

8. The system as recited in claim 7 which further comprises means for replicating the first and the second role interface file to a plurality of systems in network and;

means for storing a first and a second interface definition file each having an identical identification number in a computer memory; and means for compiling the first and a second interface definition files to produce the first interface file compiled from the first interface definition file and the second interface file compiled from the second interface definition file, the compiling means producing asymmetric interface files.

9. The system as recited in claim 7 which further comprises an automatic interface definition file editor resident in memory for creating the second interface definition file by copying the first interface definition file and adding a character string to each service name in the copy of the first interface definition file.

10. The system as recited in claim 7 wherein the first interface file is a server interface file and the second interface file is a client interface file.

11. The system as recited in claim 7 wherein the service names in the first interface file differ from the service names in the second interface file by an identical set of characters.

12. The system as recited in claim 7 which further comprises:

a memory for storing the first and second interface files, the first replica and sets of instructions for the linking, calling and transforming means;

a processor executing the set of instructions to control the system; and a display to present results of instruction execution.

13. A computer program product for generating a communication interface for a peer-to-peer application distributed in a computer network, executable on a system having a processor and a memory coupled together by a system bus, the product comprising:

means for linking copies of a first and a second interface file to a plurality of replicas of the peer-to-peer application, the first and second interface files including an interface identification number and a different respective first and second set of service names for a set of common services;

means for calling for a first service from a first replica playing a first role by a second replica playing a second role with the second interface file linked to a second replica, the first service call including the interface identification number and a serial number of the first service; and means for transforming the first service call with the first interface file linked to the first replica using the serial number to identify the first service to a procedure call understood by the first replica.

14. The product as recited in claim 13 further comprising:

means for storing a first and a second interface definition file each having an identical identification number in a computer memory; and means for compiling the first and second interface definition files to produce the first interface file compiled from the first interface definition file and the second interface file compiled from the second interface definition file, the compiling means producing asymmetric interface files.

15. The product as recited in claim 13 wherein the first interface file is a server interface file and the second interface file is a client interface file.

16. The product as recited in claim 13 wherein the service names in the first interface file differ from the service names in the second interface file by an identical set of characters.

17. The product as recited in claim 13 which further comprises an automatic interface definition file editor for creating the second interface definition file by copying the first interface definition file and altering a character string to each service name in the copy of the first interface definition file.

18. The system as recited in claim 7 further comprising:

a plurality of computer systems each having a memory to store copies of the first and second interface files and a replica of the peer-to-peer application and a processor for executing sets of instructions therein, and a network coupling the plurality of computer systems together.

* * * * *

UNITED STATES PATENT AND TRADEMARK OFFICE
CERTIFICATE OF CORRECTION

PATENT NO. : 5,764,982
DATED     : June 9, 1998
INVENTOR(S) : Madduri

It is certified that error appears in the above-identified patent and that said Letters Patent is hereby corrected as shown below:

Column 1, line 46, please delete "cases," and substitute --cases;--;
Column 2, line 8, please delete "serve" and substitute --servers--.

Signed and Sealed this

Eighth Day of June, 1999

Attest:

Q. TODD DICKINSON

*Attesting Officer*      *Acting Commissioner of Patents and Trademarks*